(12) United States Patent
Yu et al.

(10) Patent No.: US 7,330,300 B1
(45) Date of Patent: Feb. 12, 2008

(54) OPTICAL FREQUENCY MIXER AND METHOD FOR THE SAME

(75) Inventors: Borwen Yu, Hsinchu (TW); Ming-Hsien Chou, Hsinchu (TW)

(73) Assignee: HC Photonics Corp. (TW)

( * ) Notice: Subject to any disclaimer, the term of this patent is extended or adjusted under 35 U.S.C. 154(b) by 0 days.

(21) Appl. No.: 11/466,000

(22) Filed: Aug. 21, 2006

(51) Int. Cl.
*G02F 1/35* (2006.01)
(52) U.S. Cl. ...................... 359/330; 359/326
(58) Field of Classification Search ............... 359/326, 359/330
See application file for complete search history.

(56) References Cited

U.S. PATENT DOCUMENTS

| | | | |
|---|---|---|---|
| 6,570,904 B1 * | 5/2003 | Cheng et al. | ................. 372/93 |
| 6,697,391 B2 | 2/2004 | Grossman et al. | |
| 6,726,763 B2 | 4/2004 | Lee et al. | |
| 6,762,876 B2 | 7/2004 | Tilleman et al. | |
| 7,016,389 B2 * | 3/2006 | Dudley et al. | ................. 372/75 |

* cited by examiner

*Primary Examiner*—Jennifer Doan
(74) *Attorney, Agent, or Firm*—Connolly Bove Lodge & Hutz LLP

(57) ABSTRACT

An optical frequency mixer according to one embodiment of the present invention comprises a V-shaped resonant cavity including a first reflective surface, a second reflective surface and an output coupler, a pumping unit configured to emit a pumping wave to the laser gain medium to generate a resonating wave in the resonant cavity, a nonlinear crystal positioned on an optical path of the resonating wave in the resonant cavity, and an input interface configured to emit a mixing wave into the resonant cavity. Preferably, the output coupler can be a plano-concave lens having a concave surface configured to reflect the resonating wave and to focus the resonating wave such that the spot size of the resonating wave is matched the spot size of the pumping wave. Particularly, the nonlinear crystal is positioned between the output coupler and the input interface.

24 Claims, 13 Drawing Sheets

OPTICAL FREQUENCY MIXER AND METHOD FOR THE SAME

BACKGROUND OF THE INVENTION (A) Field of the Invention

The present invention relates to an optical frequency mixer and method for the same, and more particularly, to an optical frequency mixer using a resonant cavity having a nonlinear crystal to generate a wavelength shifting through a nonlinear frequency mixing process and the method for the same.

(B) Description of the Related Art

Nonlinear crystal, including periodically poled domains on a ferroelectric single crystal such as lithium niobate, may be widely used in technical fields such as optical storage, optical measurement and optical communication. Particularly, nonlinear optical crystals are also proposed to be used for optical frequency mixing to generate a laser beam having a certain wavelength from at least one source beam through a nonlinear frequency mixing process.

U.S. Pat. No. 6,762,876 discloses an optical converter with a designated output wavelength. The optical converter includes an optical sum frequency generator (SFG) and an optical difference frequency generator (DFG). The SFG receives part of both an input beam carrying information and a continuous-wave (CW) optical pump beam, while the DFG receives part of the input beam as well as the output of the SFG. The output of the DFG represents the signal of the input beam modulated on a beam having the frequency of the pump beam.

U.S. Pat. No. 6,697,391 discloses an optical fourth-harmonic generation system including a V-shaped resonant cavity configured to support an electromagnetic radiation of a fundamental frequency and a fourth-harmonic generator (FHG) disposed within the resonant cavity to produce an electromagnetic radiation of a fourth-harmonic frequency by an interaction with the electromagnetic radiation of the fundamental frequency. The fundamental radiation is characterized by a p-polarization that is complementary to an s-polarization that characterizes the fourth-harmonic radiation. The fourth-harmonic generator has an output facet oriented substantially at a Brewster's angle with respect to the fundamental radiation to separate the fundamental radiation from the fourth-harmonic radiation as they emerge from the output facet.

U.S. Pat. No. 6,726,763 discloses a nonlinear crystal having an increased spectral acceptance. The nonlinear crystal includes a plurality of domains arranged serially across the nonlinear crystal, and has alternating polarity. The poling periods of the domains are varied across the nonlinear crystal so as to provide nonuniform chirping of phase matching of focused optical signals propagated through the nonlinear crystal.

SUMMARY OF THE INVENTION

One aspect of the present invention provides an optical frequency mixer using a resonant cavity having a nonlinear crystal to generate a wavelength shifting through a nonlinear frequency mixing process and the method for the same.

An optical frequency mixer according to this aspect of the present invention comprises a V-shaped resonant cavity including a first reflective surface, a second reflective surface and an output coupler, a pumping unit configured to emit a pumping wave to the laser gain medium to generate a resonating wave in the resonant cavity, a nonlinear crystal positioned on an optical path of the resonating wave in the resonant cavity, and an input interface configured to emit a mixing wave into the resonant cavity. Preferably, the output coupler can be a dichroic mirror such as a plano-concave lens having a concave surface configured to reflect the resonating wave and to focus the resonating wave such that the spot size of the resonating wave is matched with the spot size of the pumping wave. Particularly, the nonlinear crystal is positioned between the output coupler and the input interface.

The nonlinear crystal includes a plurality of periodically poled domains having alternating polarity orientation, and the widths of the domains may be the same or vary along the propagation direction of the resonating wave. In addition, the longitudinal widths of the domains along the propagation direction of the resonating wave varies along a lateral direction perpendicular to the propagation direction. Further, the nonlinear crystal may include a first poling portion having a plurality of first domains and a second poling portion having a plurality of second domains, and the widths of the first domains is different from the widths of the second domains along the propagation direction of the resonating wave. The first poling portion may be positioned in parallel or in cascade to the second poling portion with respect to the propagation direction of the resonating wave.

Another aspect of the present invention provides a method for frequency mixing comprising the steps of generating a resonating wave in a resonant cavity having a nonlinear crystal and emitting a mixing wave into the resonating cavity such that the resonating wave interacts with the mixing wave in the nonlinear crystal to generate an output wave having a wavelength different from those of the resonating wave and the mixing wave. The method may further comprise a step of changing the spot size of the resonating wave by a plano-concave lens having a concave surface for focusing the resonating wave.

Preferably, the resonating wave interacts with the mixing wave in the nonlinear crystal to generate the output wave through a nonlinear frequency mixing process selected from the group consisting of sum frequency generation process, difference frequency generation process, second harmonic generation process and combinations thereof. In addition, the method may further comprise a step of matching phases of the resonating wave and the mixing wave in the nonlinear crystal by periodically poled domains having alternating polarity orientation in the nonlinear crystal.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
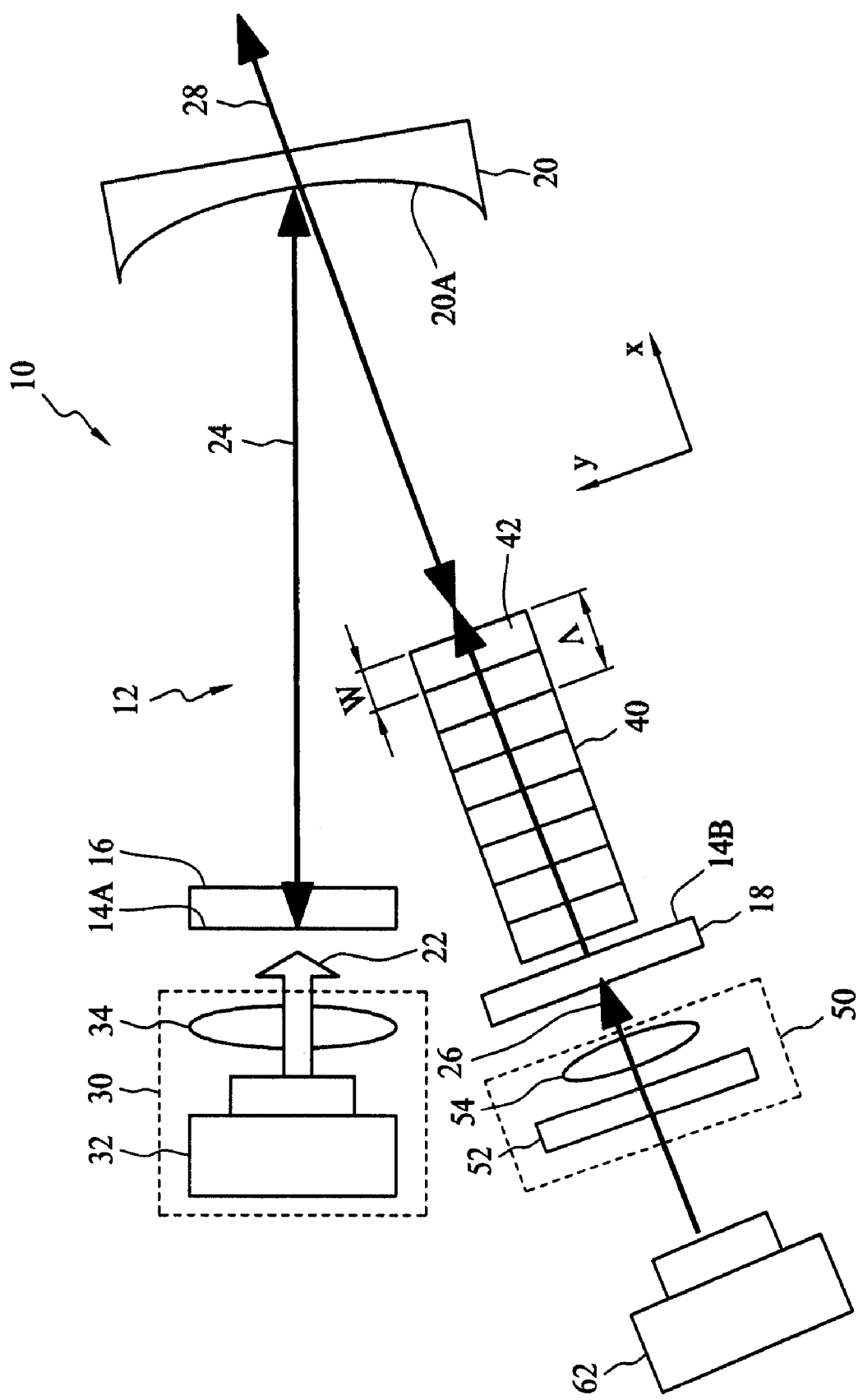
FIG. 1 illustrates an optical frequency mixer according to one embodiment of the present invention.

FIG. 1 illustrates an optical frequency mixer 10 according to one embodiment of the present invention. The optical frequency mixer 10 comprises a resonant cavity 12 including a first reflective surface 14A on a laser gain medium 16, a second reflective surface 14B on a mirror 18 and an output coupler 20, a pumping unit 30 configured to emit a pumping wave 22 to the laser gain medium 16 to generate a resonating wave 24 in the resonant cavity 12, a nonlinear crystal 40 positioned on an optical path of the resonating wave 24 in the resonant cavity 12, and an input interface 50 configured to emit a mixing wave 26 into the resonant cavity 12. The laser gain medium 16 can be solid state crystals such as $Nd:YVO_4$, Nd:YAG, or $Nd:GdVO_4$, semiconductors such as AlGaInP/GaAs, InGaAs/GaAs, or AlGaAs/GaAs. The nonlinear crystal 40 includes a plurality of periodically poled domains 42 having alternating polarity orientation.

Preferably, the output coupler 20 is a plano-concave lens having a concave surface 20A configured to reflect and focus the resonating wave 24 such that the spot size of the resonating wave 24 can match with the spot size of the pumping wave 22. Particularly, the nonlinear crystal 40 is positioned between the output coupler 20 and the input interface 50. The pumping unit 30 includes a laser diode 32 capable of generating the pumping wave 22 and a pump-coupling lens 34 configured to couple the pumping wave 22 to the laser gain medium 16. The input interface 50 includes an optical connector 52 configured to receive a mixing unit including an external laser source 62 such as a laser diode capable of generating the mixing wave 26 such as a continuous wave and a mix-coupling lens 54 configured to couple the mixing wave 26 to the nonlinear crystal 40. The mixing unit may further include a pulsing device, and the mixing wave 26 is a series of pulses.

In brief, the operation of the frequency mixer 10 comprises the steps of generating the resonating wave 24 in the resonant cavity 12 having the nonlinear crystal 40, emitting the mixing wave 26 into the resonating cavity 12 such that the resonating wave 24 interacts with the mixing wave 26 in the nonlinear crystal 40 to generate an output wave 28 having a wavelength different from those of the resonating wave 24 and the mixing wave 26, and separating the output wave 28 from the resonating wave 24 by the output coupler 20. In addition, the spot size of the resonating wave 24 is changed by the output coupler 20 of the plano-concave lens serving to focus and reflect the resonating wave 24, and the periodically poled domains 42 having alternating polarity in the nonlinear crystal 40 is used for phase matching of the resonating wave 24 and the mixing wave 26.

Figure 2:
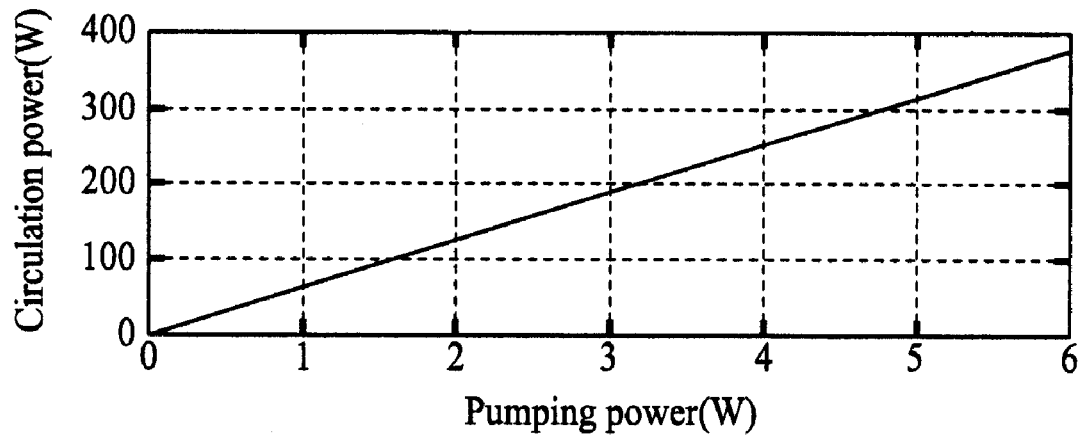
FIG. 2 shows the theoretical simulation of the circulation power of the resonating wave in the resonant cavity according to the present invention.
Figure 3:
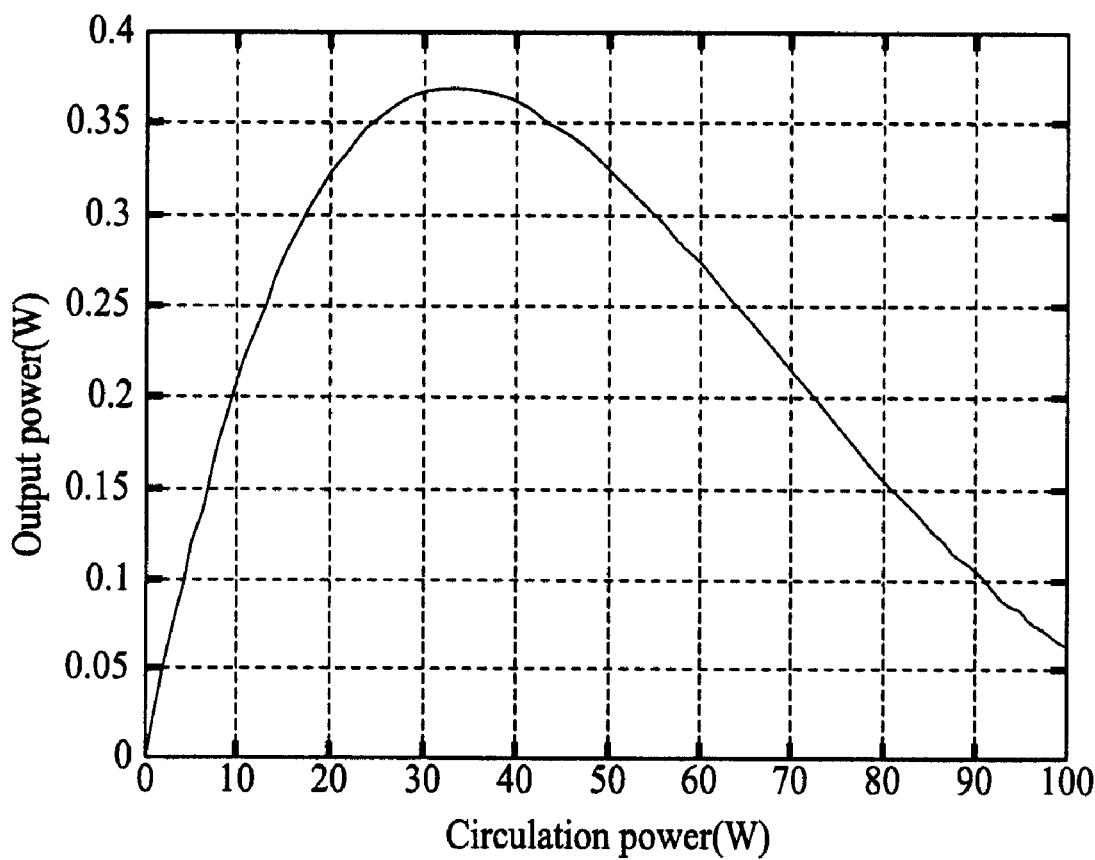
FIG. 3 shows the relation between the output powers of the output wave and the resonating wave according to the present invention.

FIG. 2 shows the theoretical simulation of the circulation power of the resonating wave 24 in the resonant cavity 12 in relation to the pump power of the pumping wave 22, and FIG. 3 shows the relation between the output powers of the output wave 28 and the resonating wave 24 according to the present invention. $Nd:YVO_4$ solid state crystal is used as the laser gain medium 16 and pumped by the pumping wave 22 having a wavelength of 808 nm to generate the resonating wave 24 having a wavelength of 1064 nm, the mixing wave has a wavelength of 905 nm and 200 mW, and the nonlinear frequency process occurring in the nonlinear crystal 40 is sum frequency generation (SFG). When the output power of the output wave 28 reaches the maximum of approximately 0.37 W, the circulation power of the resonating wave 24 is about 37 W. Accordingly, the pumping power of the pumping wave 22 is less than 1 W. The optical frequency mixer 10 possesses the advantage of highly efficient generation of new wavelength by mixing different wavelengths and nonlinear crystals.

Figure 4A:
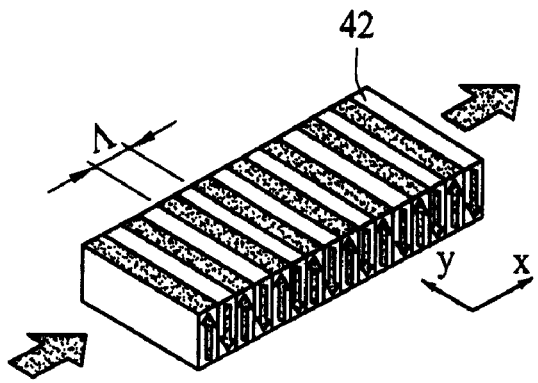
FIG. 4(a) to FIG. 4(e) illustrate the structure of the nonlinear crystal according to one embodiment of the present invention.
Figure 4D:
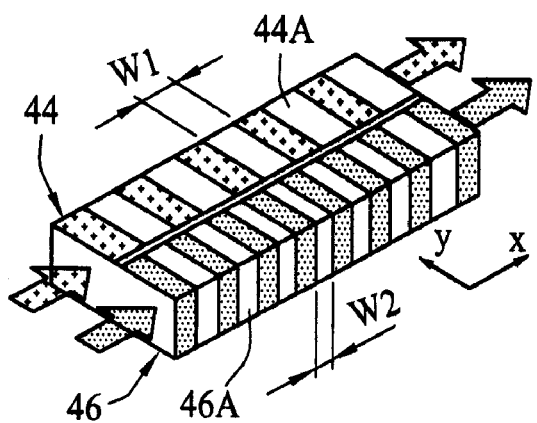
Figure 4B:
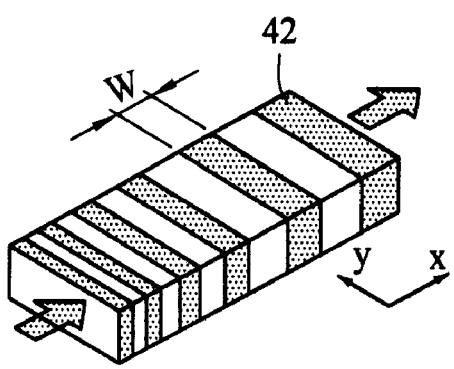
Figure 4E:
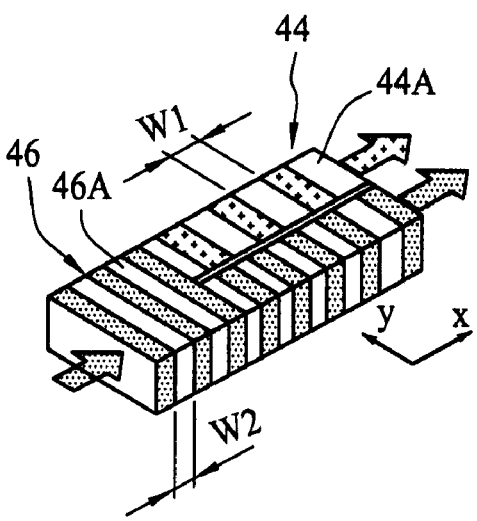
Figure 4C:
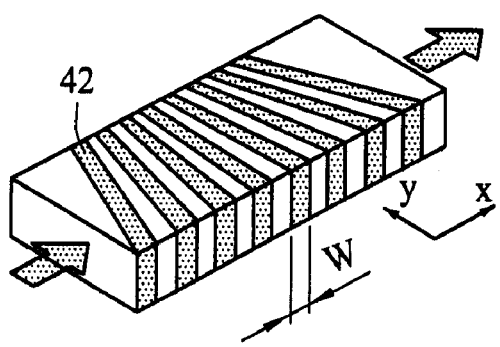

FIG. 4(a) to FIG. 4(e) illustrate the structure of the nonlinear crystal 40 according to one embodiment of the present invention. The nonlinear crystal 40 includes a plurality of periodically poled domains 42 having alternating polarity orientation, and the longitudinal widths (W) of the domains 42 and the poling period ($\lambda$) is the same along the propagation direction (x) of the resonating wave 24, i.e., known as quasi-phase matching (QPM), as shown in FIG. 4(a). In addition, the longitudinal widths (W) of the domains 42 and the poling period ($\Lambda$) may vary along the propagation direction (x) of the resonating wave 24, i.e., known as chirped quasi-phase matching, as shown in FIG. 4(b). In addition, the longitudinal widths (W) of the domains 42 along the propagation direction (x) of the resonating wave 24 may vary along a lateral direction (y) perpendicular to the propagation direction (x), as shown in FIG. 4(c). In other words, the poling period ($\Lambda$) of nonlinear crystal 40 can be designed to compensate the group velocity delay of pulse laser mixed in the optical frequency mixer 40. As a result, the generated pulse width can be narrowed down.

Furthermore, the nonlinear crystal 40 may include a first poling portion 44 having a plurality of first domains 44A and a second poling portion 46 having a plurality of second domains 46A, and the widths (W1) of the first domains 44A is different from the widths (W2) of the second domains 46A along the propagation direction (x) of the resonating wave 24. The first poling portion 46 may be positioned in parallel or in cascade to the second poling portion 44 with respect to the propagation direction (x) of the resonating wave 24, as shown in FIG. 4(d) and FIG. 4(e), respectively. In other words, the nonlinear crystal 40 can be manufactured in multiple channels, i.e., two poling portions in parallel, and the nonlinear crystal 40 can be adjusted by translation function to allow the optical frequency mixer 10 to be usable for at least two mixing wavelengths.

The resonating wave 24 interacts with the mixing wave 26 in the nonlinear crystal 40 to generate the output wave 28 through a nonlinear frequency mixing process including sum frequency generation (SFG) process, difference frequency generation (DFG) process, second harmonic generation (SHG) process or combinations thereof. Particularly, the phase matching of the resonating wave 24 and the mixing wave 26 are achieved in the nonlinear crystal 40 by the periodically poled domains 42 having alternating polarity orientation in the nonlinear crystal 40.

The sum frequency generation (SFG) process results in a short wavelength. For example, the resonating wave 24 in the resonating cavity 12 has a wavelength of 1064 nm and the mixing wave 26 has different wavelengths, and the mixed results for the SFG process can be 1064 nm+635 nm→397 nm, 1064 nm+808 nm→459 nm, or 1064 nm+532 nm→355 nm. The mixing output ranges from visible to ultraviolet bands, and the grating period of the nonlinear crystal 40 is preferably less than 6 µm. In contrast, the difference frequency generation (DFG) process results in longer wavelength. For example, the resonating wave 24 still has a wavelength of 1064 nm and the mixing wave 26 is different, and the mixed results for the DFG process can be 1064 nm+1550→nm3.39 µm or 1064 nm+1300 → nm5.86 µm. The mixing output is extended from middle IR to sub-millimeter wave, and the grating period is preferably longer than 20 µm. As to the cascaded SHG/SFG or SHG/DFG processes, SHG occurs first to double the input frequency, 1064 nm→(SHG) 532 nm for instance, and then partial energy of 1064 nm can be mixed with 532 nm to generate UV-wavelength in the subsequent SFG process, 1064 nm+532 nm→355 nm.

Figure 5:
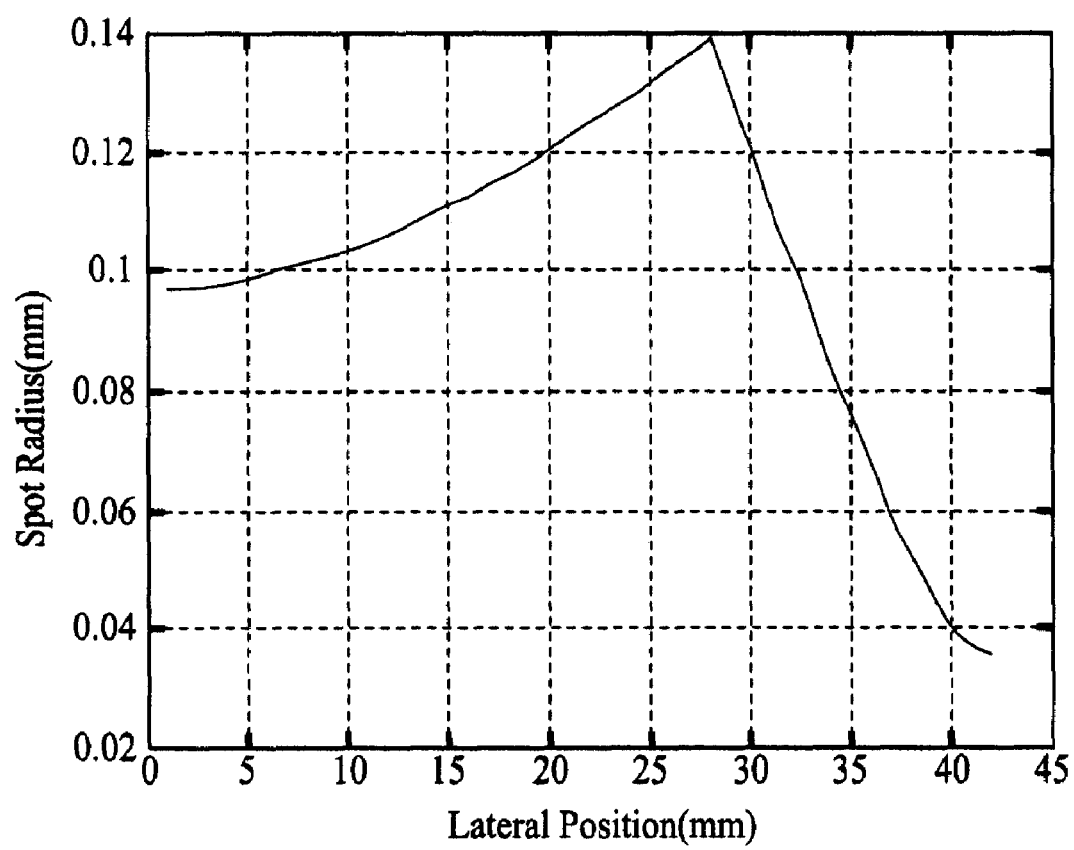
FIG. 5 shows the variation of the spot size of the resonating wave with respect to the lateral position in the resonant cavity according to one embodiment of the present invention.

FIG. 5 shows the variation of the spot size of the resonating wave 24 with respect to the lateral position in the resonant cavity 12 according to one embodiment of the present invention. The lateral position starts from the first reflective surface 14A to the second reflective surface 14B. One design rule for the frequency mixer 10 is that the higher intensity of the resonating wave 24, the better efficiency of the nonlinear frequency mixing. With the utilization of the plano-concave lens at a lateral position of 28 mm around the middle of the V-shaped resonant cavity 12, the focusing ability of the concave surface of the plano-concave lens decreases the spot size of the resonating wave 24 propagating toward the nonlinear crystal 40 at a lateral position of 42 mm from 0.14 mm to about 0.035 mm, which is contributory to nonlinear frequency mixing efficiency, i.e., to optimize the optical-to-optical transformation.

Figure 6A:
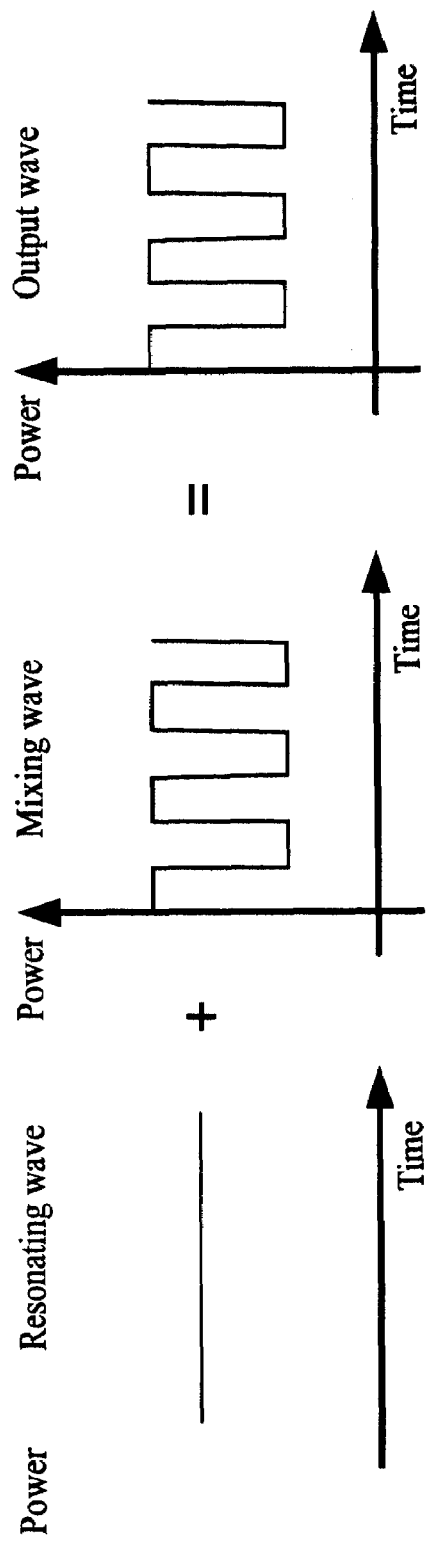
FIG. 6(a) and FIG. 6(b) illustrate the modulation of the output wave by the mixing wave in pulses or in a continuous form, respectively.
Figure 6B:
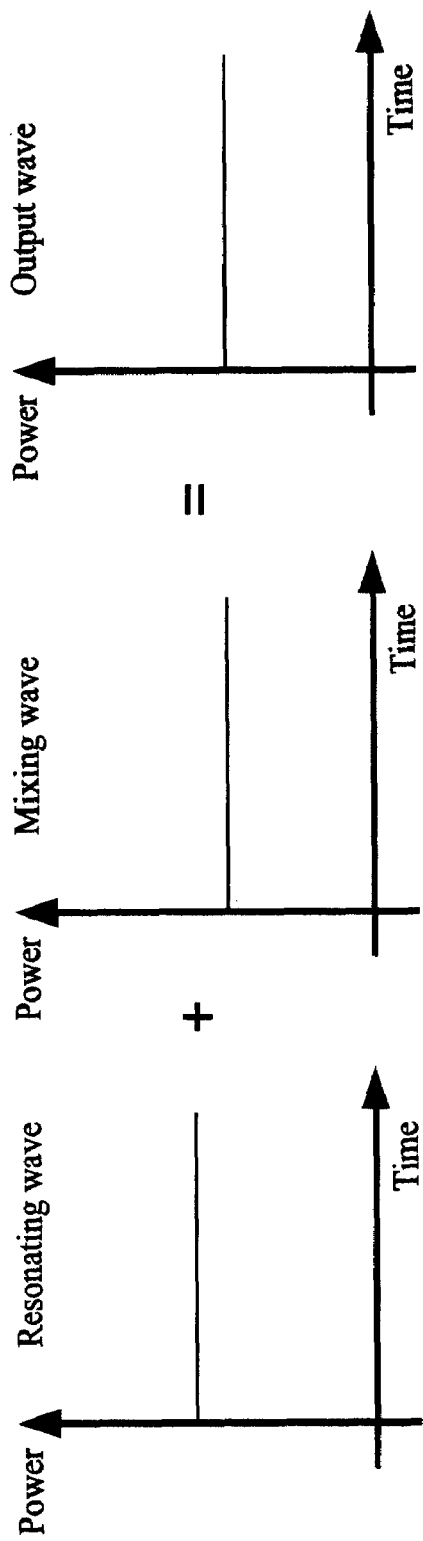

FIG. 6(a) and FIG. 6(b) illustrate the modulation of the output wave 28 mixed by the mixing wave 26 in pulses or in a continuous form, respectively. The mixing wave 26 may carry information, or be amplitude-modulated with information in pulse form, and the nonlinear frequency mixing of the mixing wave 26 and the resonating wave 24 in the nonlinear crystal 40 results in an output wave 28 carrying the information in pulses. In addition, the resonating wave 24 can be modulated by the mixing wave 26 in a continuous form, as shown in FIG. 6(b). The new wavelength generation of the optical frequency mixer 10 is based on photonic conversion, such as the SFG or DFG processes in the nonlinear crystal 40. Therefore, the response time can be up to ultra-fast (pico-second or femto-second) and achieve a high frequency repetition rate without oscillation delay in the optical frequency mixer 10. In other words, the optical frequency mixer 10 can be modulated by ultra-fast or high frequency signal of the mixing wave 26 from the input interface 50 to perform all optical modulation.

Figure 7A:
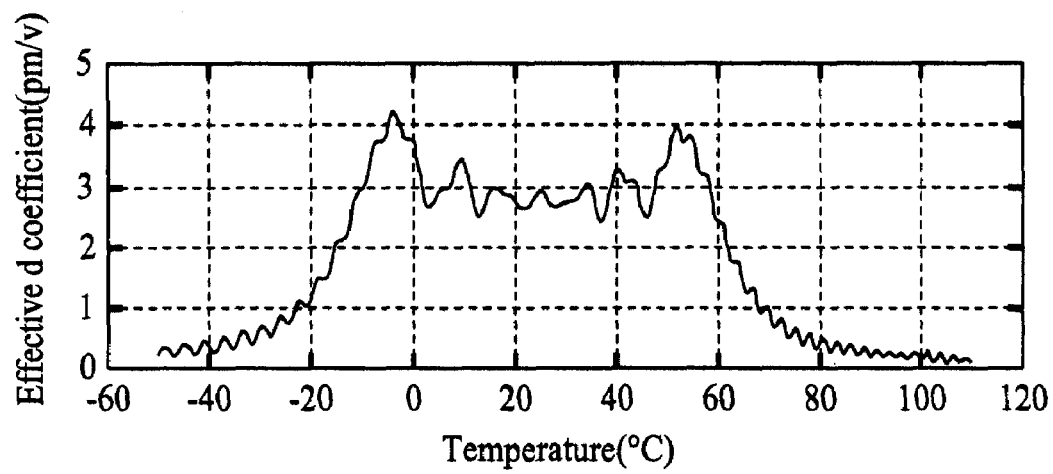
FIG. 7(a) and FIG. 7(b) illustrate the broadband operation range of optical frequency mixer in temperature and in wavelength, respectively.
Figure 7B:
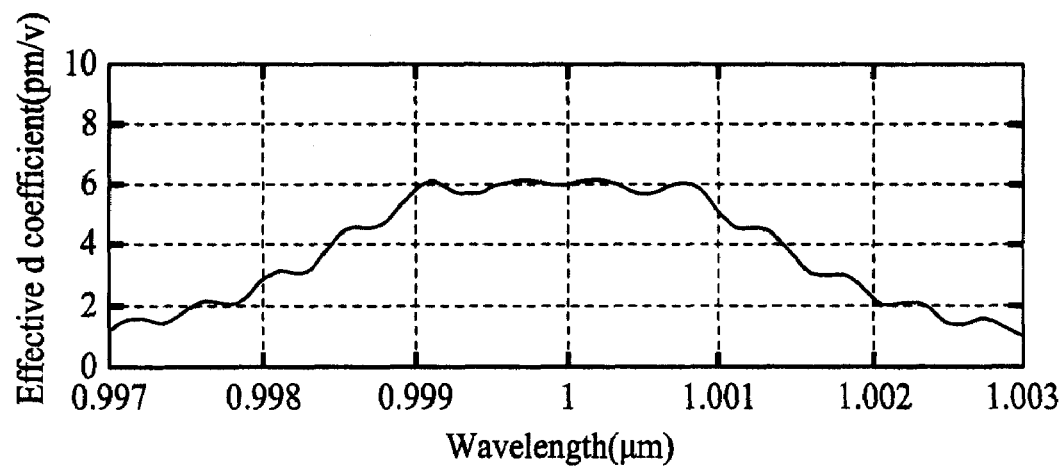

FIG. 7(a) and FIG. 7(b) illustrate the broadband operation range of the optical frequency mixer in temperature and in wavelength, respectively. The nonlinear frequency mixing efficiency is proportional to "effective d coefficient" shown on the vertical axis in FIG. 7(a) and FIG. 7(b). The bandwidth is defined as the full width half maximum (FWHM), and bandwidth of the optical frequency mixer 10 is around 70° C. in temperature and around 3 nm in wavelength.

Figure 8:
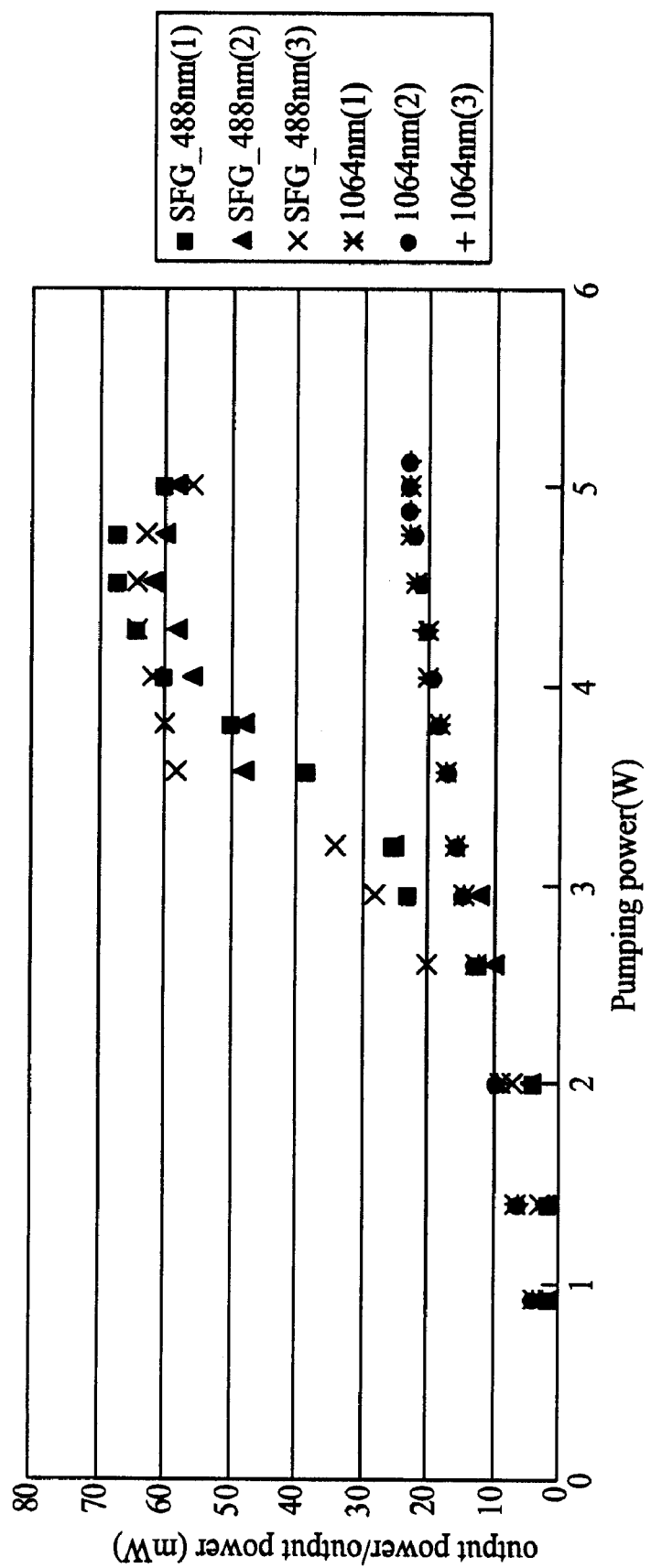
FIG. 8 illustrates the relation between the output power of the resonating wave and the output power of the output wave with respect to the pumping power of the pumping wave.

FIG. 8 illustrates the relation between the circulation power of the resonating wave 24 and the output power of the output wave 28 with respect to the pumping power of the pumping wave 22. The optical frequency mixer 10 uses 0.5%-Nd:YVO4, 5 mm-long as the laser gain medium 16; 808 nm LD 5 W as the pumping source; HR>99.9% @1064 nm; PP MgO:LN (periodically poled MgO:LiNbO3) 10 mm-long with 5.3 µm grating period as the nonlinear crystal 40; and 200 mW, 905 nm as the mixing wave 26 to generate the output wave 28 of 488 nm.

The resonating wave 24 having a wavelength of 1064 nm is generated from the pumping wave 22 having a wavelength of 808 nm pumping the laser gain medium 16 of $Nd:YVO_4$ crystal. The output power of the resonating wave 24 is saturated at pumping power 4.7 W pump, induced by thermal perturbation in a resonator. The power can also be estimated for circulation power based on fixed reflective ratio on the output coupler 20. Therefore, the 1064 nm-circulation power will be saturated at 4.7 W pump (808 nm) and its estimated power is 30~40 W for 99.93% HR at 1064 nm.

The poling period of the nonlinear crystal 40 is 5.3 µm and the mixing wave 26 of 905 nm is mixed with the resonating wave 24 of 1064 nm through the nonlinear crystal 40 to generate the output wave 28 having a wavelength of 488 nm. The output power of the output wave 28 is saturated at pumping power of 4.5 W (4.5 W pump). The power level (4.5 W-pump) is less than that of 1064 nm-power (4.7 W-pump). That means the power saturation of the output wave 28 of 488 nm is due to nonlinear transformation but 1064 nm-power supplement, i.e., the resonant intra-cavity 12 can supply sufficient 1064 nm-power until output power of the output wave 28 cannot be increased with more 1064 nm power.

Figure 9:
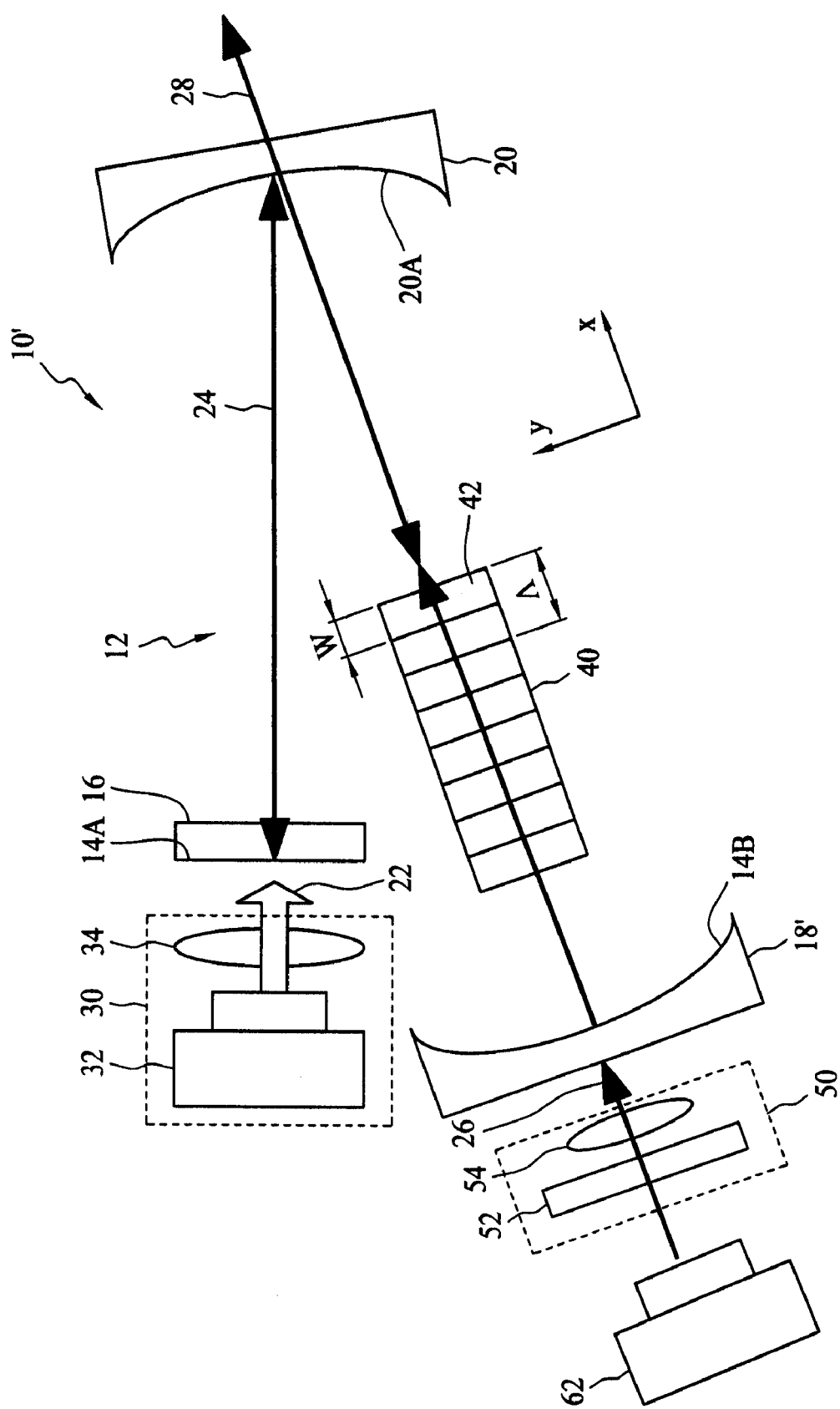
FIG. 9 and FIG. 10 illustrate two optical frequency mixers according to other embodiments of the present invention, respectively.
Figure 10:
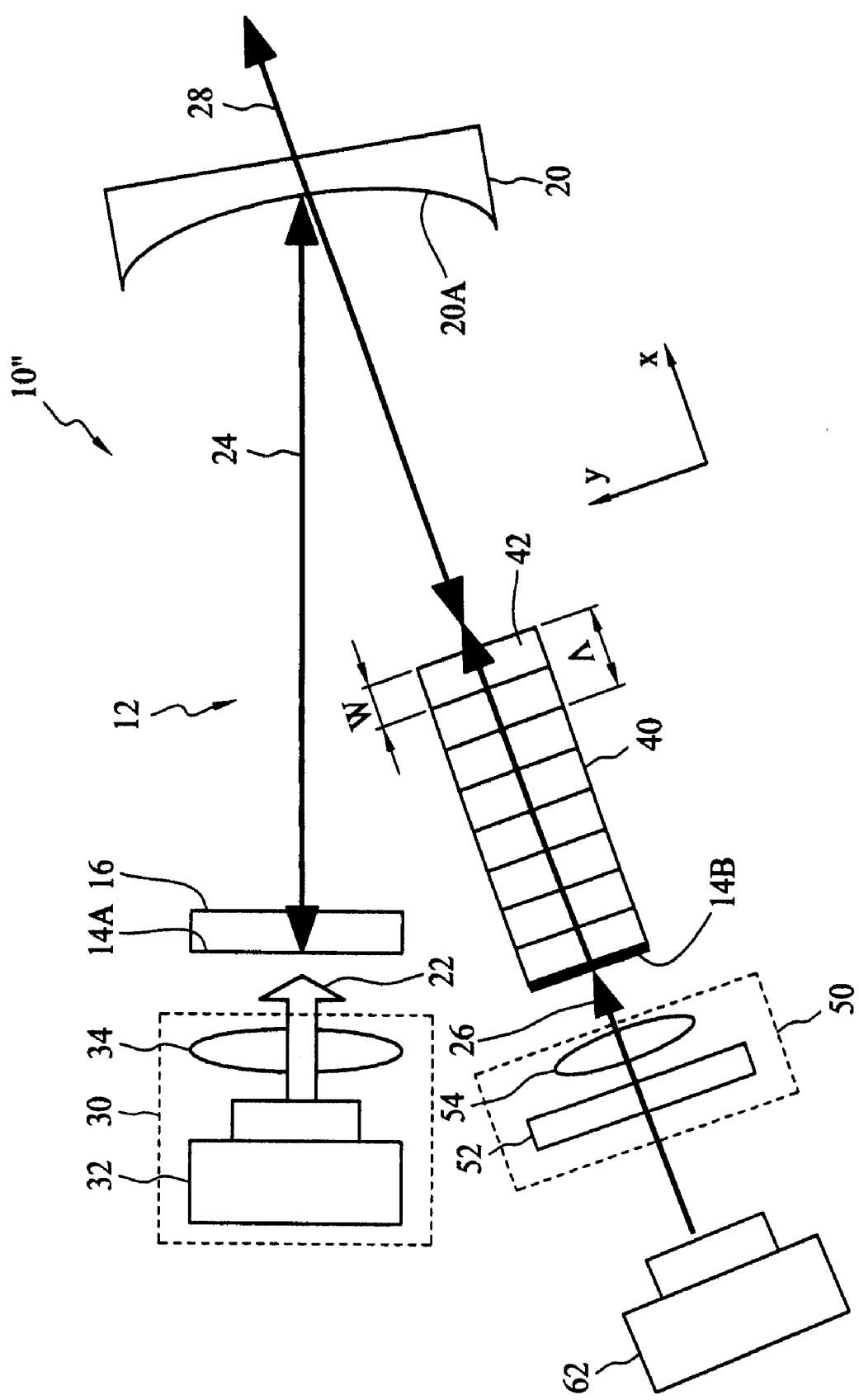

FIG. 9 and FIG. 10 illustrate two optical frequency mixers 10', 10" according to other embodiments of the present invention, respectively. In comparison with the optical frequency mixers 10 in FIG. 1, the optical frequency mixer 10' in FIG. 9 uses a plano-concave lens 18' having a concave surface as the second reflective surface 14B instead of the mirror 18. As to the optical frequency mixer 10" in FIG. 10, the second reflective surface 14B is positioned on an end surface of the nonlinear crystal 40 close to the input interface 50.

Figure 11:
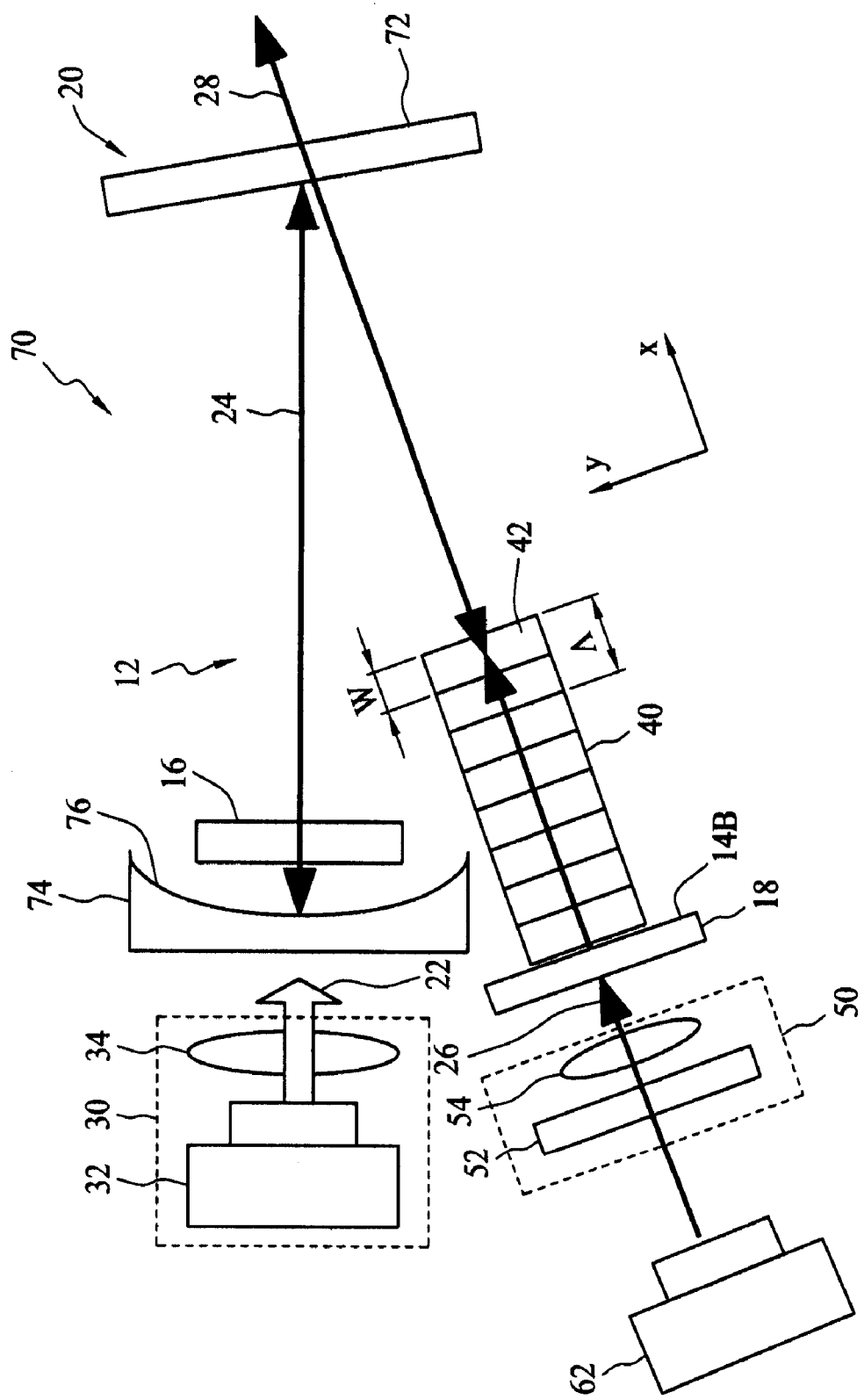
FIG. 11 and FIG. 12 illustrate an optical frequency mixers 60 and the variation of the spot size of the resonating wave 24 with respect to the lateral position in the resonant cavity 12 according to another embodiments of the present invention.
Figure 12:
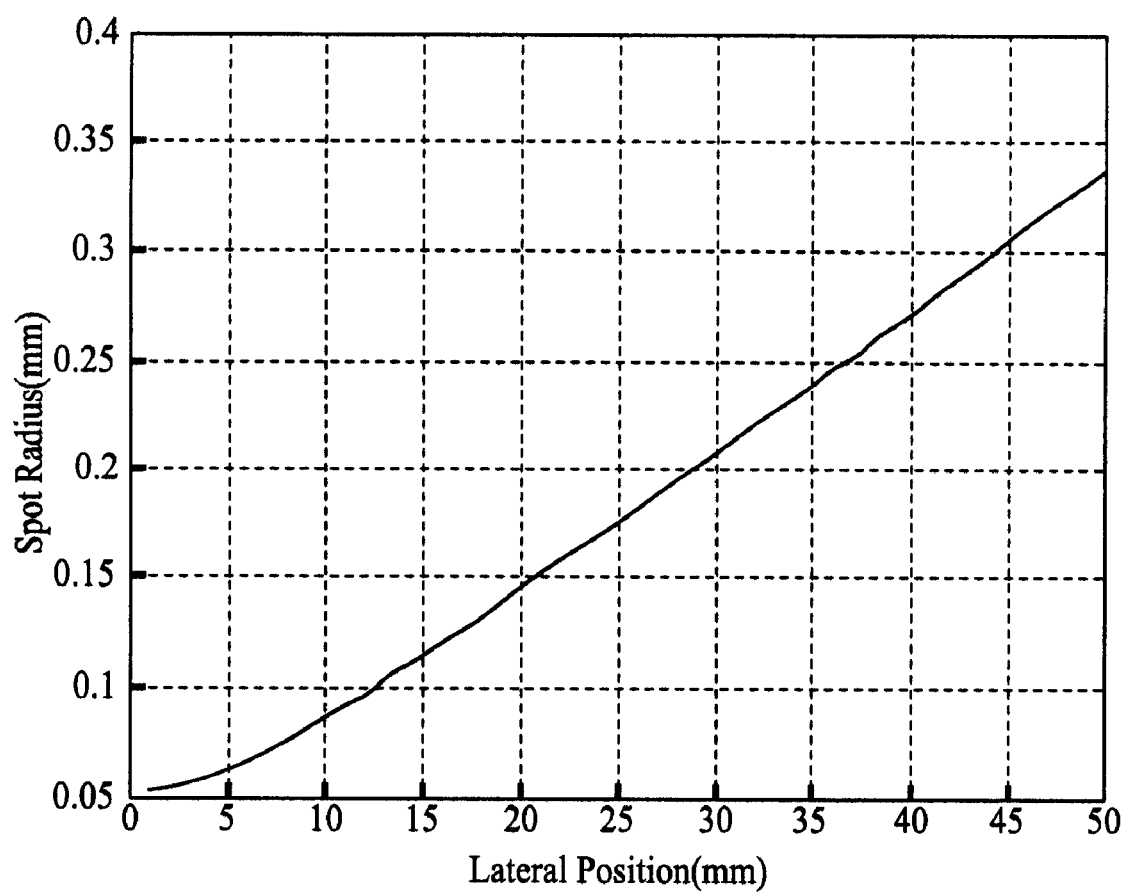

FIG. 11 and FIG. 12 illustrate an optical frequency mixer 70 and the variation of the spot size of the resonating wave 24 with respect to the lateral position in the resonant cavity 12 according to another embodiments of the present invention, respectively. In comparison with the optical frequency mixers 10 in FIG. 1, the optical frequency mixer 72 in FIG. 11 uses a first reflective surface 76 positioned on a plano-concave lens 74 and a dichroic mirror 72 as the output coupler 20. The variation of the spot size of the resonating wave 24 increases as the lateral position of the resonate cavity 12, and the lateral position starts from the second reflective surface 14B to the first reflective surface 76, as shown in FIG. 12.

Figure 13:
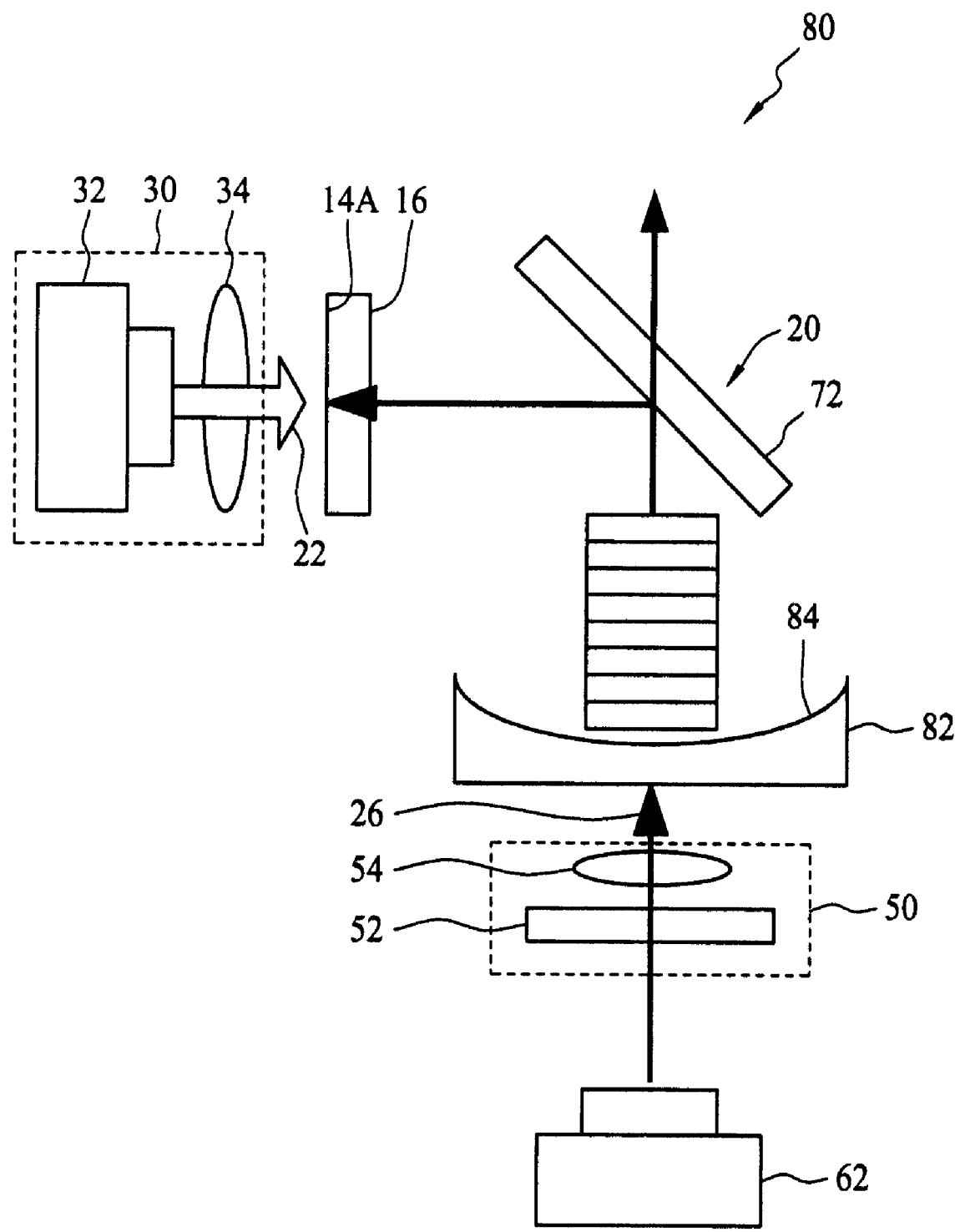
FIG. 13 and FIG. 14 illustrate an optical frequency mixers 60' and the variation of the spot size of the resonating wave 24 with respect to the lateral position in the resonant cavity 12 according to another embodiments of the present invention, respectively.
Figure 14:
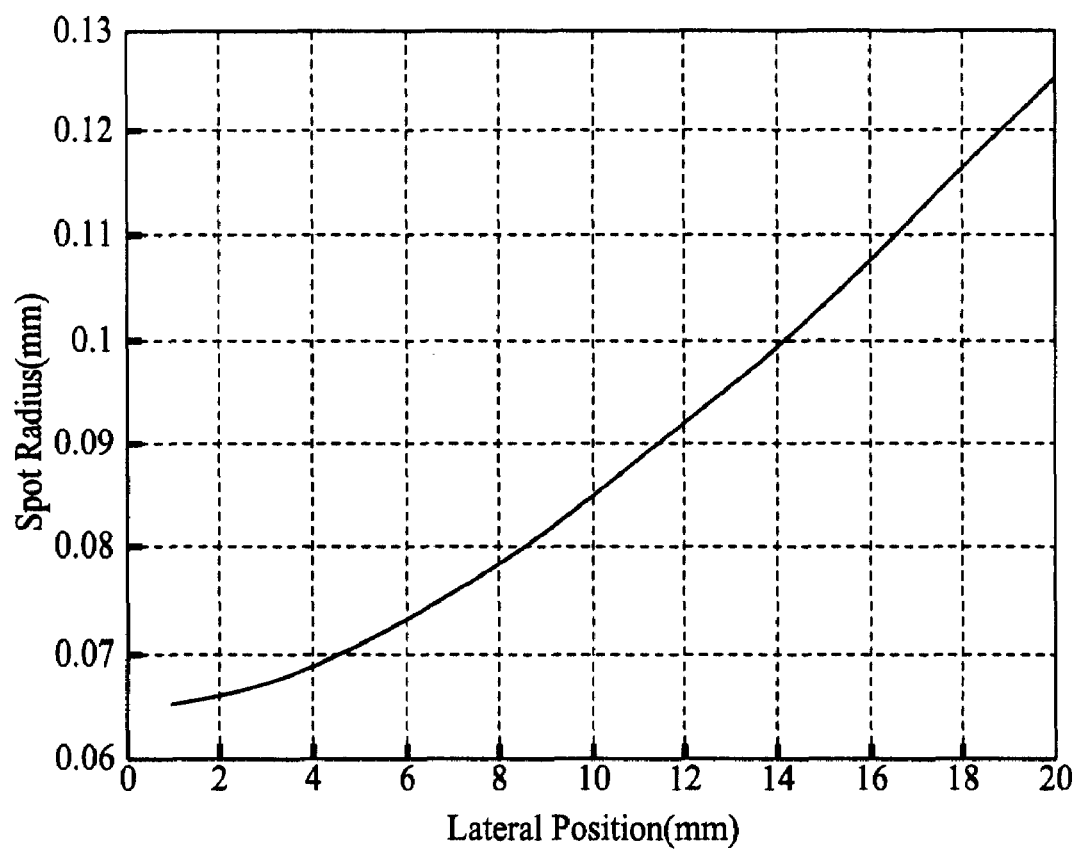

FIG. 13 and FIG. 14 illustrate an optical frequency mixer 80 and the variation of the spot size of the resonating wave 24 with respect to the lateral position in the resonant cavity 12 according to another embodiments of the present invention, respectively. In comparison with the optical frequency mixers 10 in FIG. 1, the optical frequency mixer 80 in FIG. 13 uses a second reflective surface 84 positioned on a plano-concave lens 82 and a dichroic mirror 72 as the output coupler 20. The variation of the spot size of the resonating wave 24 increases as the lateral position of the resonate cavity 12, and the lateral position starts from the first reflective surface 14A to the second reflective surface 84, as shown in FIG. 14.

The above-described embodiments of the present invention are intended to be illustrative only. Numerous alternative embodiments may be devised by those skilled in the art without departing from the scope of the following claims.

What is claimed is:

1. An optical frequency mixer, comprising:
   a resonant cavity including a first reflective surface, a second reflective surface and an output coupler;
   a pumping unit configured to emit a pumping wave to the laser gain medium to generate a resonating wave in the resonant cavity;
   a nonlinear crystal positioned on an optical path of the resonating wave in the resonant cavity, wherein the nonlinear crystal includes a plurality of domains having alternating polarity and the widths of the domains are the same along a propagation direction of the resonating wave; and
   an input interface configured to emit a mixing wave into the resonant cavity.

2. The optical frequency mixer of claim 1, wherein the resonant cavity is configured in a V-shaped manner.

3. The optical frequency mixer of claim 1, wherein the pumping unit includes a laser diode capable of generating the pumping wave and a pump-coupling lens configured to couple the pumping wave to the laser gain medium.

4. The optical frequency mixer of claim 1, wherein the output coupler is a plano-concave lens having a concave surface configured to reflect the resonating wave.

5. The optical frequency mixer of claim 1, wherein the spot size of the resonating wave is matched with the spot size of the pumping wave.

6. The optical frequency mixer of claim 1, wherein the output coupler is a dichroic mirror.

7. The optical frequency mixer of claim 1, wherein the longitudinal widths of the domains along a propagation direction of the resonating wave varies along a direction perpendicular to the propagation direction.

8. The optical frequency mixer of claim 1, wherein the nonlinear crystal includes:
   a first poling portion having a plurality of first domains having alternating polarity; and
   a second poling portion having a plurality of second domains having alternating polarity, wherein the widths of the first domains is different from the widths of the second domains along a propagation direction of the resonating wave.

9. The optical frequency mixer of claim 8, wherein the first poling portion is positioned in parallel to the second poling portion with respect to a propagation direction of the resonating wave.

10. The optical frequency mixer of claim 8, wherein the first poling portion is positioned in cascade to the second poling portion along a propagation direction of the resonating wave.

11. The optical frequency mixer of claim 1, wherein the second reflective surface is positioned on a mirror positioned between the nonlinear crystal and the input interface.

12. The optical frequency mixer of claim 1, wherein the second reflective surface is positioned on an end surface of the nonlinear crystal close to the input interface.

13. The optical frequency mixer of claim 1, wherein the second reflective surface is a concave surface of a plano-concave lens.

14. The optical frequency mixer of claim 1, wherein the input interface includes an optical connector configured to receive a mixing unit including a laser diode capable of generating the mixing wave and a mix-coupling lens configured to couple the mixing wave to the nonlinear crystal.

15. The optical frequency mixer of claim 14, wherein the mixing unit further includes a pulsing device, and the mixing wave is a series of pulses.

16. The optical frequency mixer of claim 14, wherein the mixing wave is a continuous wave.

17. The optical frequency mixer of claim 1, wherein the nonlinear crystal is positioned between the output coupler and the input interface.

18. A method for frequency mixing, comprising the steps of: generating a resonating wave in a resonant cavity having a nonlinear crystal; and emitting a mixing wave into the resonating cavity such that the resonating wave interacts with the mixing wave in the nonlinear crystal to generate an output wave having a wavelength different from those of the resonating wave and the mixing wave, wherein the resonating wave interacts with the mixing wave in the nonlinear crystal to generate the output wave through a nonlinear frequency mixing process selected from the group consisting of sum frequency generation process, difference frequency generation process, second harmonic generation process and combinations thereof.

19. The method for frequency mixing of claim 18, further comprising a step of changing the spot size of the resonating wave.

20. The method for frequency mixing of claim 19, wherein the spot size of the resonating wave is changed by a plano-concave lens having a concave surface for focusing the resonating wave.

21. The method for frequency mixing of claim 18, further comprising a step of separating the output wave from the resonating wave by an output coupler.

22. The method for frequency mixing of claim 18, further comprising a step of matching phases of the resonating wave and the mixing wave by periodically poled domains having alternating polarity in the nonlinear crystal.

23. An optical frequency mixer, comprising:
   a resonant cavity including a first reflective surface, a second reflective surface and an output coupler;
   a pumping unit configured to emit a pumping wave to the laser gain medium to generate a resonating wave in the resonant cavity;
   a nonlinear crystal positioned on an optical path of the resonating wave in the resonant cavity, wherein the spot size of the resonating wave is matched with the spot size of the pumping wave and the widths of the domains vary along a propagation direction of the resonating wave; and
   an input interface configured to emit a mixing wave into the resonant cavity.

24. An optical frequency mixer, comprising:
   a resonant cavity including a first reflective surface, a second reflective surface and an output coupler;
   a pumping unit configured to emit a pumping wave to the laser gain medium to generate a resonating wave in the resonant cavity;

a nonlinear crystal positioned on an optical path of the resonating wave in the resonant cavity, wherein the nonlinear crystal includes a plurality of domains having alternating polarity and the widths of the domains vary along a propagation direction of the resonating wave; and an input interface configured to emit a mixing wave into the resonant cavity.

* * * * *